(12) United States Patent
An et al.

(10) Patent No.: US 11,852,195 B2
(45) Date of Patent: Dec. 26, 2023

(54) BEARING CAGE AND ROLLING BEARING WITH THE SAME

(71) Applicant: Aktiebolaget SKF, Gothenburg (SE)

(72) Inventors: Hongyuan An, Shanghai (CN); Xinru Peng, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/892,237

(22) Filed: Aug. 22, 2022

(65) Prior Publication Data

US 2023/0075968 A1 Mar. 9, 2023

(51) Int. Cl.
*F16C 19/06* (2006.01)
*F16C 33/41* (2006.01)
*F16C 33/38* (2006.01)

(52) U.S. Cl.
CPC .......... *F16C 33/3887* (2013.01); *F16C 19/06* (2013.01); *F16C 33/418* (2013.01)

(58) Field of Classification Search
CPC ...... F16C 19/06; F16C 33/3887; F16C 33/41; F16C 33/412; F16C 33/414; F16C 33/416; F16C 33/418
See application file for complete search history.

(56) References Cited

U.S. PATENT DOCUMENTS

| | | | | |
|---|---|---|---|---|
| 5,553,949 A | * | 9/1996 | Fukuwaka | F16C 33/418 |
| | | | | 384/523 |
| 5,642,945 A | * | 7/1997 | Abe | F16C 33/418 |
| | | | | 384/470 |
| 6,709,161 B2 | * | 3/2004 | Yakura | F16C 33/7846 |
| | | | | 384/488 |
| 2003/0235357 A1 | * | 12/2003 | Hiramatsu | F16C 19/163 |
| | | | | 384/523 |
| 2018/0283453 A1 | * | 10/2018 | Ishii | F16C 19/163 |

FOREIGN PATENT DOCUMENTS

| CN | 114645903 A | * | 6/2022 | |
|---|---|---|---|---|
| DE | 102020129165 A1 | * | 5/2021 | .............. F16C 19/16 |
| JP | 2002235751 A | * | 8/2002 | .............. F16C 33/414 |
| JP | 2006017178 A | * | 1/2006 | .............. F16C 33/416 |
| JP | 2009133483 A | * | 6/2009 | .......... F16C 33/3806 |
| JP | 2010516967 A | * | 5/2010 | |

* cited by examiner

*Primary Examiner* — Phillip A Johnson
(74) *Attorney, Agent, or Firm* — GARCIA-ZAMOR INTELLECTUAL PROPERTY LAW, LLC; Ruy Garcia-Zamor

(57) ABSTRACT

A bearing cage is used for accommodating the rolling elements of a rolling bearing; wherein, the bearing cage comprises an annular cage base; when the bearing cage is inserted and installed in the rolling bearing, there is a first circumferential radial clearance between an outer circumferential surface of the cage base and an inner circumferential surface of an outer ring shoulder of an outer ring, and a second circumferential radial clearance between an inner circumferential surface of the cage base and an outer circumferential surface of an inner ring shoulder of an inner ring; the first circumferential radial clearance is smaller or larger than the second circumferential radial clearance. A rolling bearing comprises the bearing cage as described above.

18 Claims, 10 Drawing Sheets

BEARING CAGE AND ROLLING BEARING WITH THE SAME

CROSS-REFERENCE TO RELATED APPLICATIONS

This application claims priority to Chinese Patent Application no. 202111035730.1, filed Sep. 3, 2021, the contents of which is fully incorporated herein by reference.

TECHNICAL FIELD

The present disclosure relates to a bearing cage. The disclosure also relates to a rolling bearing with the bearing cage.

BACKGROUND OF THE INVENTION

In the prior art, in order to reduce the contact force between the roller and the cage pocket at high speed and suppress the abnormal heat generation between the cage pocket and the roller, it is necessary to increase the diameter of the cage pocket. However, when the diameter of cage pocket increases, the movement of cage in radial plane will be greatly increased, which will lead to frequent contact of rolling elements with the edge of cage pocket. It is difficult to form lubricating oil film between the roller and the edge of the cage pocket, which will cause the edge of the cage pocket to wear abnormally, and even cause the edge of the cage pocket to melt. Excessive movement of the cage in the radial plane will also increase the contact force between the inner and outer diameters of the cage and the shoulders of the inner and outer rings of the bearing, thus increasing the overall deformation and instability of the cage, resulting in vibration and noise of the bearing.

SUMMARY OF THE INVENTION

In order to solve one or more defects in the prior art, according to one aspect of the present disclosure, a bearing cage is proposed to accommodate the rolling elements of rolling bearings.

The bearing cage comprises an annular cage base and an annular cage pocket extending from the cage base along the central axis direction of the bearing cage;

when the bearing cage is inserted and installed in the rolling bearing, there is a first circumferential radial clearance between an outer circumferential surface of the cage base and an inner circumferential surface of an outer ring shoulder of an outer ring of the rolling bearing, and a second circumferential radial clearance between an inner circumferential surface of the cage base and an outer circumferential surface of an inner ring shoulder of an inner ring of the rolling bearing.

When the first circumferential radial clearance is smaller than the second circumferential radial clearance, the first circumferential radial clearance is equal to the difference between the diameter of the inner circumferential surface of the outer ring shoulder and the diameter of the outer circumferential surface of the cage base divided by 2; and the first circumferential radial clearance is less than or equal to [0.005×(the bottom diameter of the inner ring raceway of the inner ring+the bottom diameter of the outer ring raceway of the outer ring)+0.01×the diameter of the roller element].

When the first circumferential radial clearance is larger than the second circumferential radial clearance, the second circumferential radial clearance is equal to the difference between the diameter of the inner circumferential surface of the cage base and the diameter of the outer circumferential surface of the inner ring shoulder divided by 2; and the second circumferential radial clearance is less than or equal to [0.0045×(the bottom diameter of the inner ring raceway of the inner ring+the bottom diameter of the outer ring raceway of the outer ring)+0.009×the diameter of the roller element].

According to the above aspect of the present disclosure, when the first circumferential radial clearance is smaller than the second circumferential radial clearance, the first circumferential radial clearance is less than or equal to [0.004×(the bottom diameter of the inner ring raceway of the inner ring+the bottom diameter of the outer ring raceway of the outer ring)+0.008×the diameter of the rolling element].

According to the above aspect of the present disclosure, when the first circumferential radial clearance is larger than the second circumferential radial clearance, the second circumferential radial clearance is less than or equal to [0.00325×(the bottom diameter of the inner ring raceway of the inner ring+the bottom diameter of the outer ring raceway of the outer ring)+0.0065×the diameter of the roller element].

In the prior art, when the bearing is in operation, the bearing cage can generate the phenomenon of shifting in the radial direction of the bearing. In order to meet some specific working conditions, such as the high-speed running of the bearing, the diameter of the pocket hole of the bearing cage for accommodating the rolling elements needs to be increased; The increase of the diameter of the pocket aggravates the running phenomenon of the bearing cage, which intensifies the friction between the roller and the pocket of the bearing cage, resulting in more serious heating, worsening the lubrication condition, and increasing the contact force between the inner and outer diameters of the bearing cage and the shoulders of the bearing inner and outer rings.

According to the above aspect of the present disclosure, the base of the cage comprises an annular cage flange extending radially outward toward the outer ring of the rolling bearing; the first circumferential radial clearance between the outer circumferential surface of the cage flange and the inner circumferential surface of the outer ring shoulder of the outer ring is smaller than or larger than the second circumferential radial clearance between the inner circumferential surface of the cage base and the outer circumferential surface of the inner ring shoulder of the inner ring.

According to the above aspect of the present disclosure, the diameter of the outer circumferential surface of the cage flange is larger than the outer diameter of the cage pocket.

According to the above aspect of the present disclosure, the diameter of the inner circumferential surface of the cage base is equal to the inner diameter of the cage pocket.

According to the above aspect of the present disclosure, a plurality of roller pocket openings which are evenly spaced from each other are arranged in the circumferential direction of the cage pocket; the roll elements can be held in the roller pocket openings; a connecting web is arranged between two adjacent roller pocket openings.

According to the above aspect of the present disclosure, a plurality of web recesses evenly spaced from each other are arranged on the inner circumferential surface of the connecting web facing the direction of the central axis; the web recess extends to the cage base; a plurality of web reinforcing ribs evenly spaced from each other are arranged on the outer circumferential surface of the connecting web facing away from the direction of the central axis; the position of the web recess on the inner circumferential surface of the connecting web facing the direction of the central axis is in the middle of two roller pocket openings adjacent to each other.

According to the above aspect of the present disclosure, the outer circumferential surface of the cage flange is provided with a plurality of flange recesses evenly spaced from each other.

According to the above aspect of the present disclosure, the position of the flange recess on the outer circumferential surface of the cage flange is in the middle of two adjacent roller pocket openings.

According to the above aspect of the present disclosure, an angle $\alpha=360°/(2\times Z)$ between the central plane of the roller pocket opening along the central axis direction and the central plane of the flange recess along the central axis direction, where Z is the number of rolling elements of the rolling bearing.

According to the above aspect of the present disclosure, the length L1 of the flange recess is set to: $\pi\times$the diameter of the outer circumferential surface of the cage flange$/(3\times Z)<=L1<=\pi\times$the diameter of the outer circumferential surface of the cage flange$/(2\times Z)$, wherein Z is the number of rolling elements of the rolling bearing.

According to the above aspect of the present disclosure, the maximum depth D1 of the flange recess is set to 0.02×the diameter of the roller elements<=D1<=0.06×the diameter of the roller elements.

According to the above aspect of the present disclosure, the width of the flange recess in the central axis direction is equal to the width of the cage flange in the central axis direction.

According to the above aspect of the present disclosure, the maximum depth of the flange recess in the radial direction relative to the central axis direction is smaller than the radial height of the cage flange in the radial direction relative to the central axis direction.

According to the above aspect of the present disclosure, the flange recess is arc-shaped or rectangular in its radial section perpendicular to the central axis.

According to the present disclosure, by adjusting the relative position of the bearing cage, the bearing cage can be guided by the outer ring or the inner ring, which reduces the phenomenon of the bearing cage jumping and reduces the risk of instability and melting of the cage.

The flange recess is arranged in the middle of two adjacent cage pockets, so that the strength reduction of the cage is minimal. The longer the circumferential length and the deeper the radial depth of the flange recess, the more beneficial it is to reduce friction and improve lubrication, but it will reduce the strength/rigidity of the cage.

According to the present disclosure, through the flange recess on the outer circumferential surface of the cage flange, the lubricant flow in the bearing is improved (that is, the lubricant can flow into the space where the rolling elements are located through the flange recess) and the wear of the outer circumferential surface of the cage flange is minimized, that is, the lubricant in the flange recess can lubricate the outer circumferential surface of the cage flange.

According to another aspect of the present disclosure, a rolling bearing is provided, which comprises an outer ring, an inner ring and rolling elements arranged between the outer ring and the inner ring, and the rolling bearing further comprises the bearing cage as described above. The bearing cage is used for accommodating the rolling elements.

So far, in order that the detailed description of this disclosure can be better understood, and the contribution of this disclosure to the prior art can be better recognized, this disclosure has outlined the contents of this disclosure quite extensively. Of course, the embodiments of the present disclosure will be described below and will form the subject of the appended claims.

Likewise, those skilled in the art will realize that the concept on which this disclosure is based can be easily used as a basis for designing other structures, methods and systems for implementing several purposes of this disclosure. Therefore, it is important that the appended claims should be considered to include such equivalent structures as long as they do not exceed the spirit and scope of this disclosure.

BRIEF DESCRIPTION OF THE FIGURES

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Through the following drawings, those skilled in the art will have a better understanding of this disclosure, and the advantages of this disclosure can be more clearly reflected. The drawings described here are only for illustrative purposes of selected embodiments, not all possible embodiments, and are intended not to limit the scope of this disclosure.

FIGS. 6 to 7 show rectangular flange recesses, wherein FIG. 7 shows a partial enlarged view of the portion indicated by B1 in FIG. 6;

DETAILED DESCRIPTION OF THE EMBODIMENTS

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty(20°) degrees, provides specific literal support for any angle greater than twenty(20°) degrees, such as twenty-three(23°) degrees, thirty(30°) degrees, thirty-three-point five) (33.5° degrees, forty-five(45°) degrees, fifty-two(52°) degrees, or the like and thus provides support for claiming a preferred embodiment with the element moving along the arcuate path thirty-three-point five(33.5°) degrees. The specific embodiments according to the present disclosure will be explained in detail with reference to the following figures.

Figure 1:
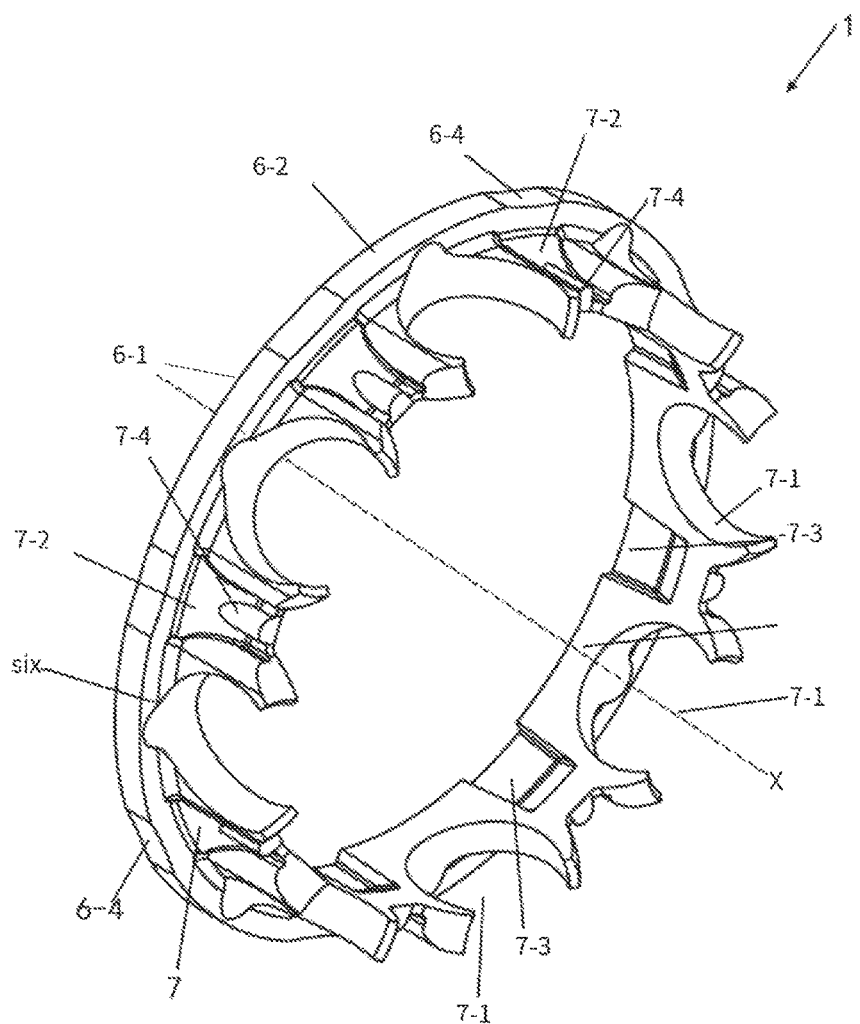
FIG. 1 shows a perspective view of a bearing cage guided by an outer ring according to the present disclosure.
Figure 2:
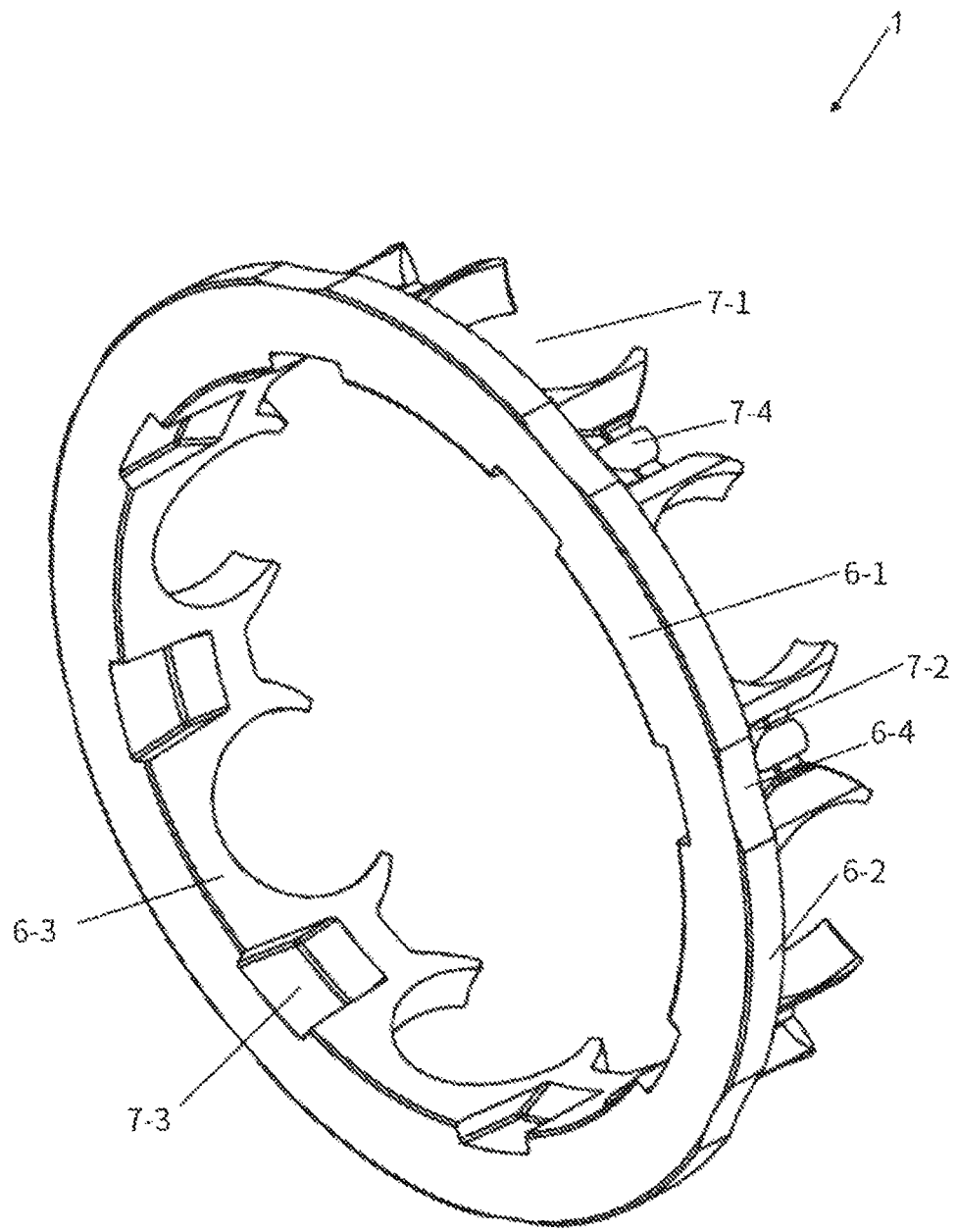
FIG. 2 shows a perspective view of a bearing cage guided by an outer ring according to the present disclosure from another perspective.
Figure 3:
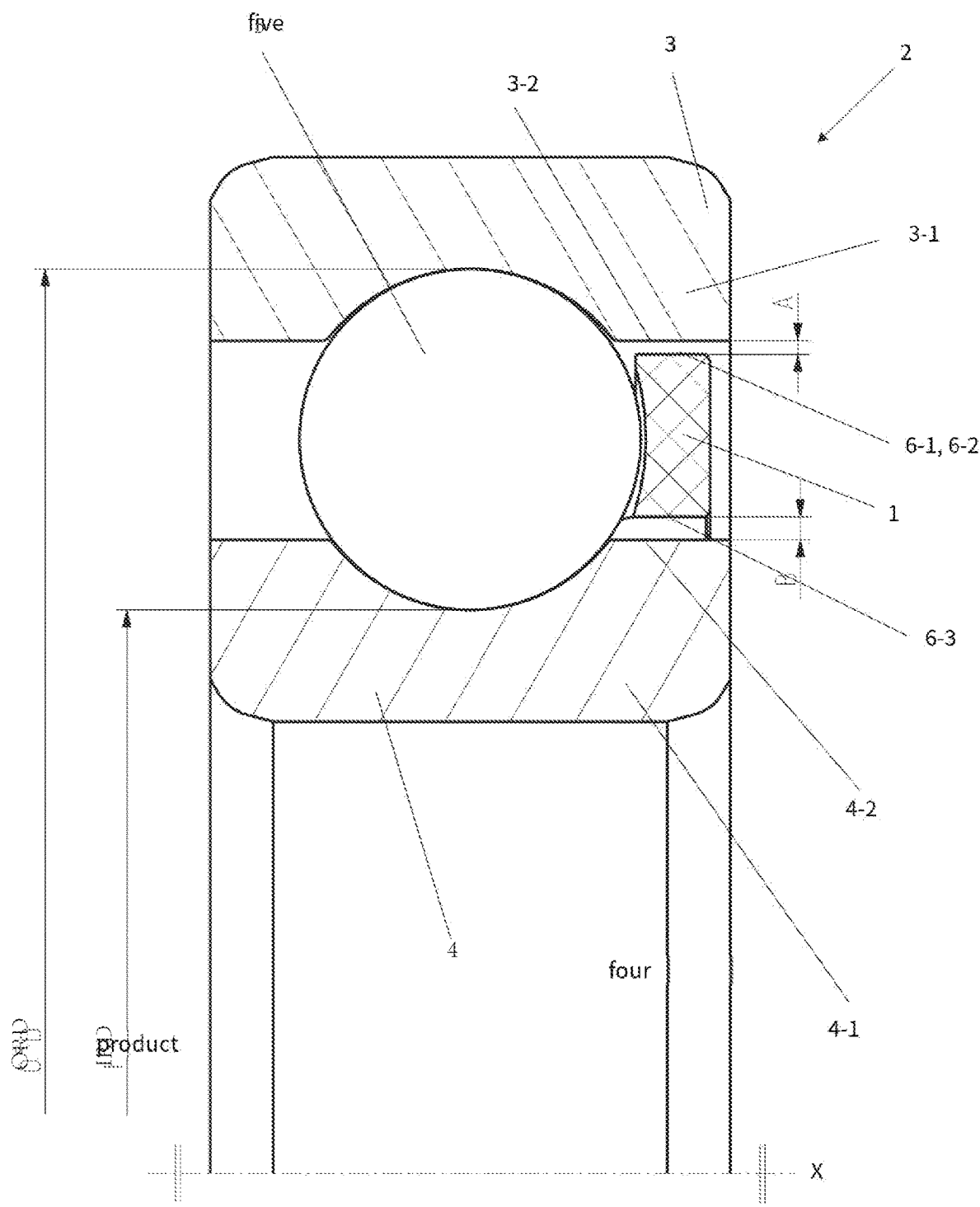
FIG. 3 shows a schematic sectional view of a rolling bearing guided by an outer ring according to the present disclosure.

FIGS. 1 and 2 show perspective views of a bearing cage 1 guided by an outer ring according to the present disclosure. FIG. 3 shows a schematic cross-sectional view of a rolling bearing 2 guided by an outer ring according to the present disclosure, in which the bearing cage 1 shown in FIG. 1 is inserted and installed in the rolling bearing 2 shown in FIG. 3. The bearing cage 1 is preferably snap-fit and made of polymer, such as but not limited to PA66-GF25, PA46-GF30, PA6T, PAST, PEEK-GF15, etc.

As shown in FIG. 3, the rolling bearing 2 comprises an outer ring 3, an inner ring 4, and rolling elements 5 disposed between the outer ring 3 and the inner ring 4.

The bearing cage 1 is inserted and installed between the outer ring 3 and the inner ring 4, accommodates the rolling elements 5, and keeps the rolling elements 5 in place relative to the outer ring 3 and the inner ring 4 in normal operation.

In the bearing cage 1 shown in FIG. 1, the bearing cage 1 comprises an annular cage base 6 and an annular cage pocket 7 extending from the cage base 6 along the direction of a central axis X of the bearing cage 1.

The cage base 6 comprises an annular cage flange 6-1 extending radially outward toward the outer ring 3 of the rolling bearing 2.

When the bearing cage 1 is inserted into the rolling bearing 2, as shown in FIG. 3, a first circumferential radial clearance A between the outer circumferential surface 6-2 of the cage flange 6-1 and the inner circumferential surface 3-2 of the outer ring shoulder 3-1 of the outer ring 3 is smaller than a second circumferential radial clearance B between the inner circumferential surface 6-3 of the cage base 6 and the outer circumferential surface 4-2 of the inner ring shoulder 4-1 of the inner ring 4, that is, the bearing cage 1 is guided by the outer ring 3.

Figure 8:
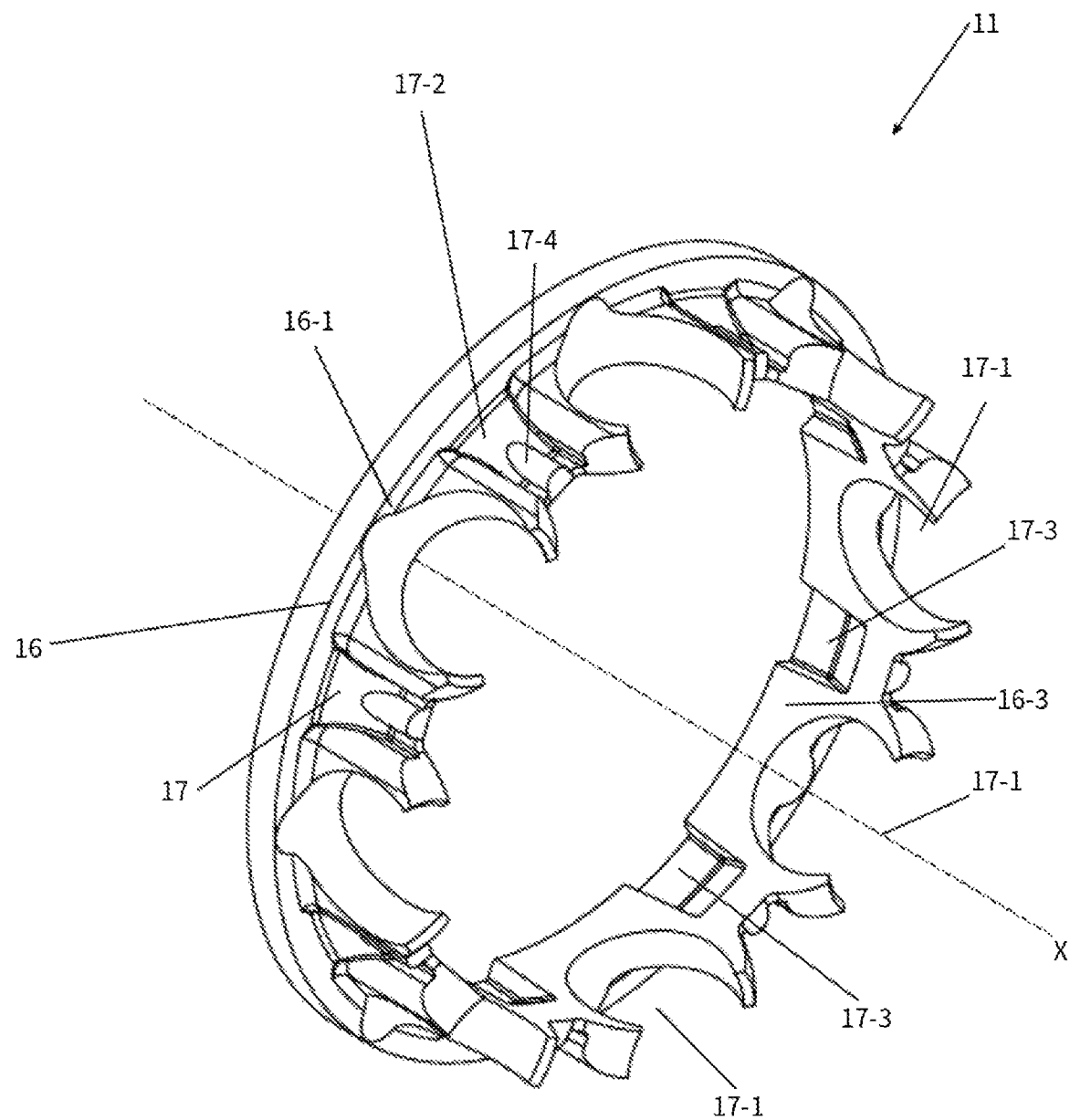
FIG. 8 shows a perspective view of a bearing cage guided by an inner ring according to the present disclosure.
Figure 9:
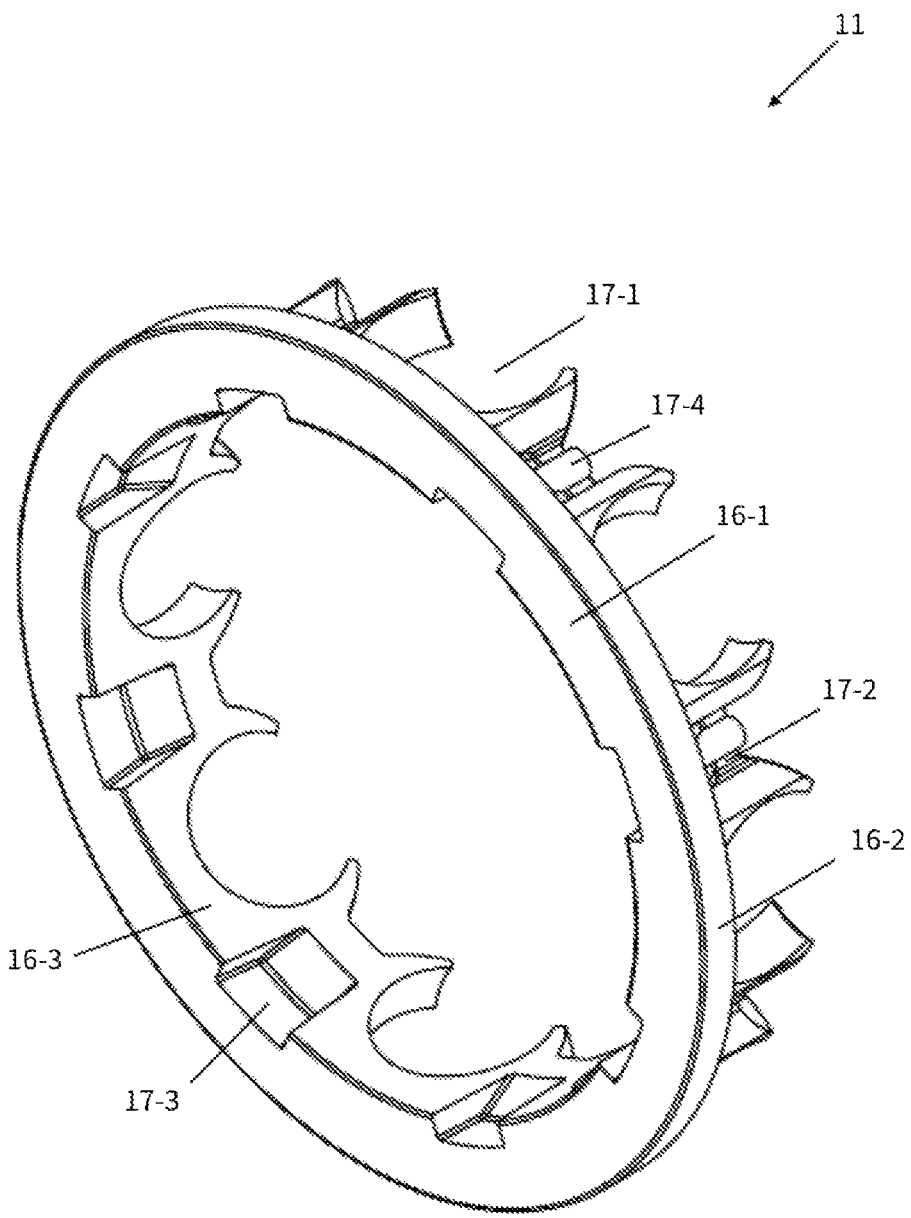
FIG. 9 shows a perspective view of a bearing cage guided by an inner ring according to the present disclosure from another perspective.
Figure 10:
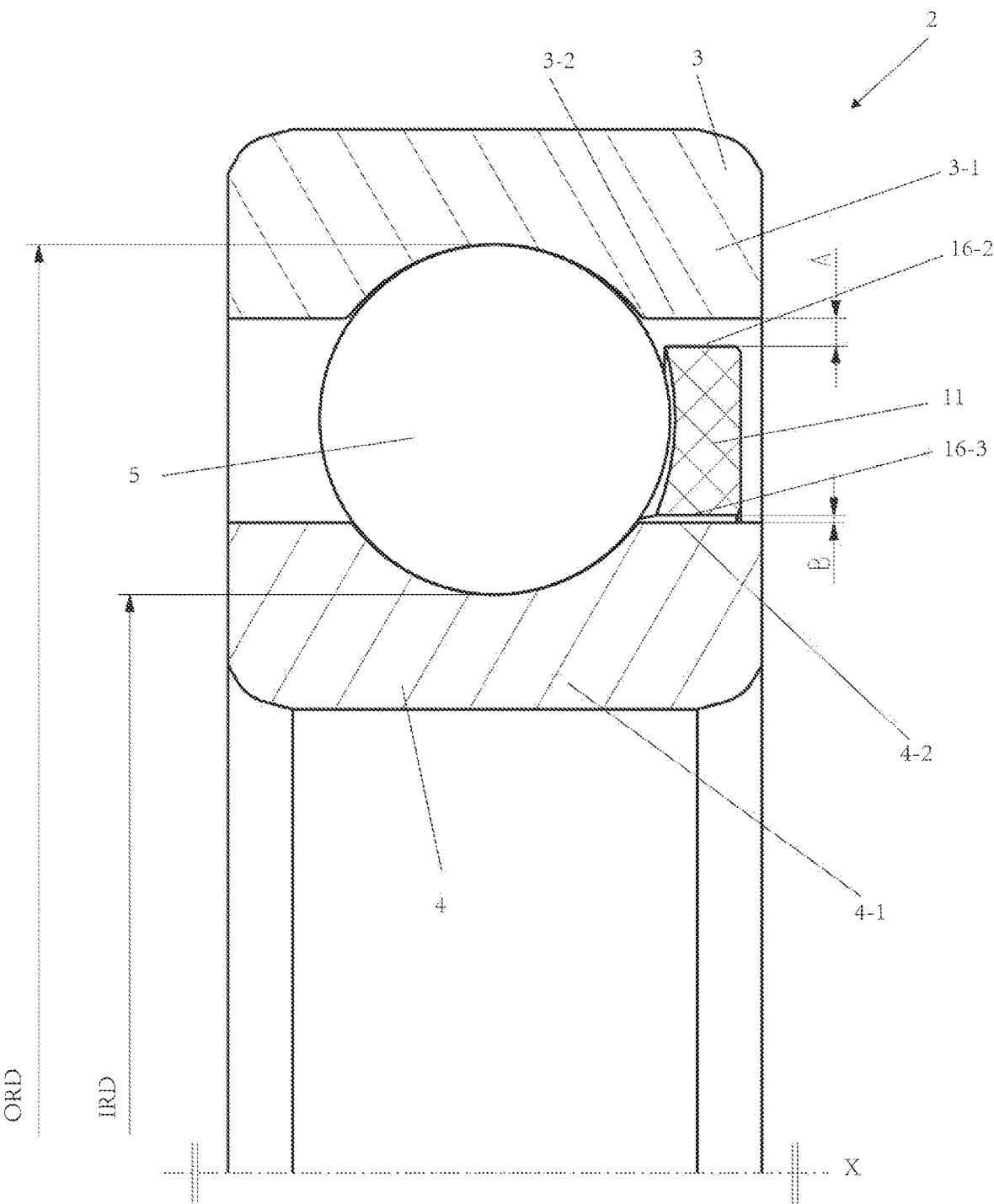
FIG. 10 shows a schematic cross-sectional view of a rolling bearing guided by an inner ring according to the present disclosure.

FIGS. 8 and 9 show perspective views of a bearing cage 11 guided by an inner ring according to the present disclosure (in order to distinguish it from the bearing cage 1 in FIGS. 1 to 3, the reference number of the bearing cage in FIGS. 8 to 10 is 11, and the reference numbers of other structural features of the bearing cage in FIGS. 8 to 10 are increased by 10 relative to the reference numbers in FIGS. 1 to 3). FIG. 10 shows a schematic sectional view of a rolling bearing 2 guided by the inner ring according to the present disclosure, in which a bearing cage 11 as shown in FIG. 8 is inserted and installed in the rolling bearing 2 as shown in FIG. 10. Because it is guided by the inner ring, there is no need to provide a flange recess 6-4 as described below on the outer circumferential surface 16-2 of the cage flange 16-1 as shown in FIGS. 8 and 9.

As shown in FIGS. 8 to 9, when the bearing cage 11 is inserted into the rolling bearing 2, the first circumferential radial clearance A between the outer circumferential surface 16-2 of the cage flange 16-1 and the inner circumferential surface 3-2 of the outer ring shoulder 3-1 of the outer ring 3 is larger than that between the inner circumferential surface 16-3 of the cage base 6 and the outer circumferential surface 4-2 of the inner ring shoulder 4-1 of the inner ring 4.

According to the above embodiments of the present disclosure, the diameter of the outer circumferential surfaces 6-2, 16-2 of the cage flanges 6-1, 16-1 is larger than the outer diameter of the cage pocket portions 7, 17.

According to the above embodiments of the present disclosure, the first circumferential radial clearance A is equal to the difference between the diameter of the inner circumferential surface 3-2 of the outer ring shoulder 3-1 and the diameter of the outer circumferential surfaces 6-2, 16-2 of the cage flanges 6-1, 16-1 divided by 2.

As shown in FIG. 3, when the first circumferential radial clearance A is smaller than the second circumferential radial clearance B, it is most preferable that the first circumferential radial clearance is less than or equal to [0.005×(the bottom diameter of the inner ring raceway of the inner ring IRD+the bottom diameter of the outer ring raceway of the outer ring ORD)+0.01×the diameter of the roller element].

Preferably, when the first circumferential radial clearance is smaller than the second circumferential radial clearance, the first circumferential radial clearance is less than or equal to [0.004×(the bottom diameter of the inner ring raceway of the inner ring IRD+the bottom diameter of the outer ring raceway of the outer ring ORD)+0.008×the diameter of the rolling element].

The second circumferential radial clearance B is equal to the difference between the diameter of the inner circumferential surfaces 6-3, 16-3 of the cage bases 6, 16 and the diameter of the outer circumferential surface 4-2 of the inner ring shoulder 4-1 divided by 2.

As shown in FIG. 10, when the first circumferential radial clearance A is larger than the second circumferential radial clearance B, it is most preferable that the second circumferential radial clearance B is less than or equal to the second circumferential radial clearance [0.0045×(the bottom diameter of the inner ring raceway of the inner ring IRD+the bottom diameter of the outer ring raceway of the outer ring ORD)+0.009×the diameter of the rolling element].

When the first circumferential radial clearance is larger than the second circumferential radial clearance, it is preferable that the second circumferential radial clearance is less than or equal to [0.00325×(the bottom diameter of the inner ring raceway of the inner ring IRD+the bottom diameter of the outer ring raceway of the outer ring ORD)+0.0065×the diameter of the rolling element].

According to the disclosed embodiment, the guide design of the outer ring 3 and the optimization of the landing clearance (that is, the first circumferential radial clearance A is smaller than the second circumferential radial clearance B and the above specific range of the first circumferential radial clearance A) limit the movement of the bearing cage in its radial plane, thus reducing the instability of the bearing cage.

According to the contents of the disclosed embodiment, it can also be understood by those skilled in the art that the guide design of the inner ring 4 and the optimization of the landing clearance (that is, the first circumferential radial clearance A is larger than the second circumferential radial clearance B and the above-mentioned specific range of the second circumferential radial clearance B) limit the movement of the bearing cage in its radial plane, thus reducing the instability of the bearing cage.

According to the above embodiments of the present disclosure, the diameter of the inner circumferential surfaces 6-3, 16-3 of the cage bases 6, 16 is equal to the inner diameter of the cage pocket portions 7, 17.

According to the above-mentioned embodiments of the present disclosure, a plurality of roller pocket openings 7-1, 17-1 are provided in the circumferential direction of the cage pocket portions 7, 17, which are evenly spaced from each other.

The roller elements 5 can be held in the roller pocket openings 7-1, 17-1.

Connecting webs 7-2, 17-2 are arranged between two adjacent roller pocket openings 7-1, 17-1.

According to the above-described embodiments of the present disclosure, a plurality of web recesses 7-3, 17-3 which are evenly spaced from each other are provided on the inner circumferential surfaces of the connecting webs 7-2, 17-2 facing the direction of the central axis X.

The web recesses 7-3, 17-3 extend to the cage bases 6, 16.

On the outer circumferential surfaces of the connecting webs 7-2, 17-2 facing away from the direction of the central axis X, a plurality of web reinforcing ribs 7-4, 17-4 are arranged evenly spaced from each other.

The positions of the web recesses 7-3, 17-3 on the inner circumferential surfaces of the connecting webs 7-2, 17-2 facing the direction of the central axis X are in the middle of two roller pocket openings 7-1, 17-1 adjacent to each other.

According to the above-described embodiments of the present disclosure, a plurality of flange recesses 6-4 which are evenly spaced with respect to each other are provided on the outer circumferential surface 6-2 of the cage flange 6-1.

Figure 4:
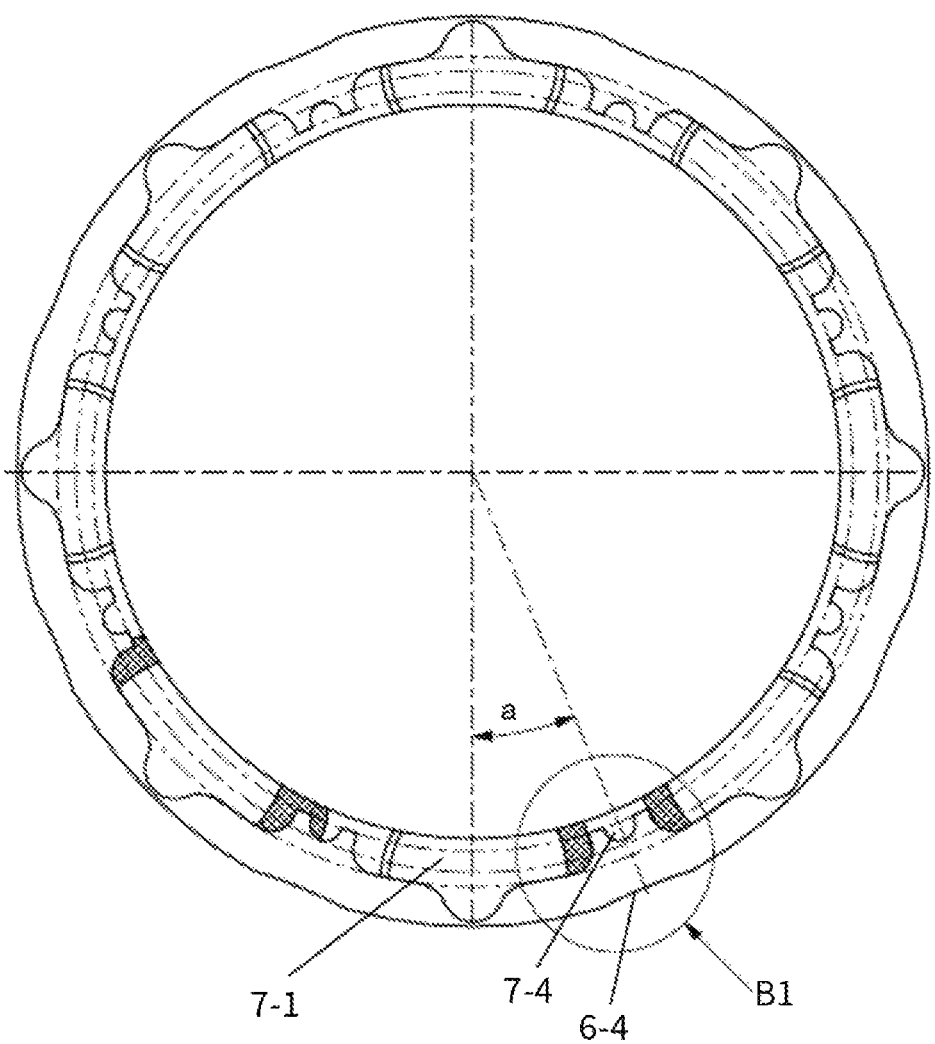
FIG. 4 shows a top plan view of FIG. 1, in which an arc-shaped flange recess is shown.
Figure 5:
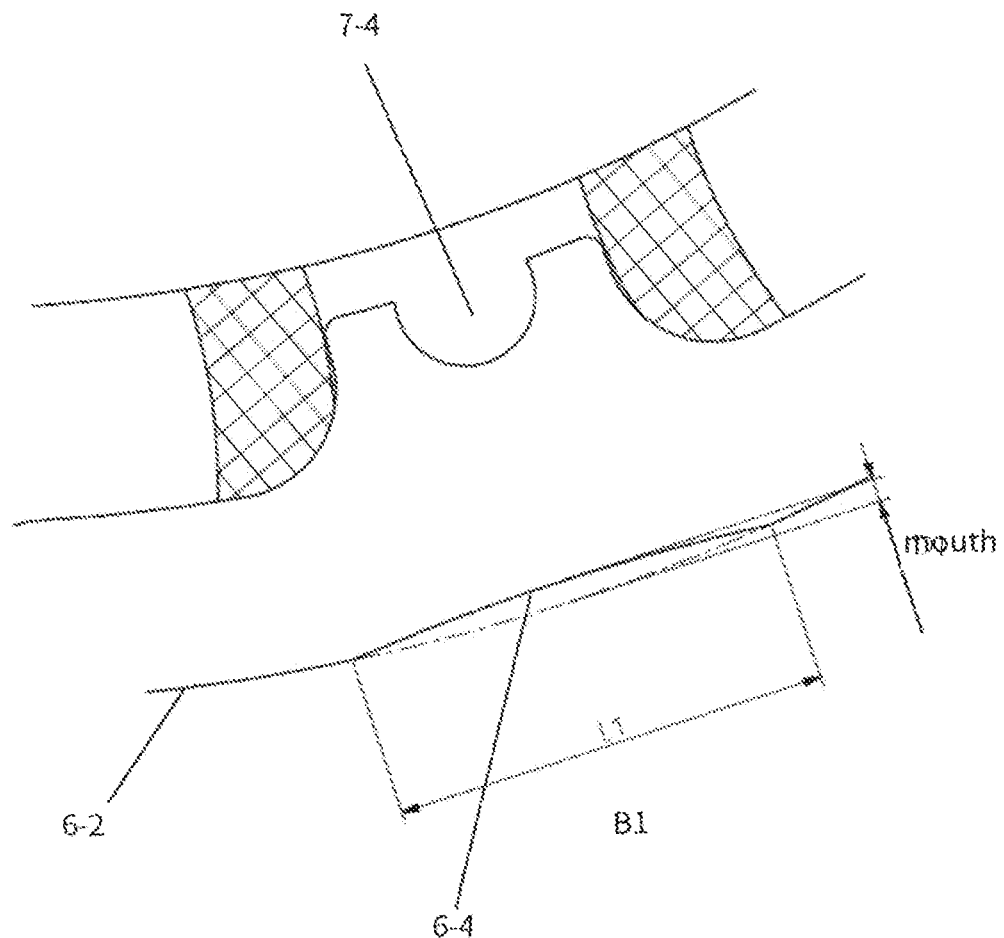
FIG. 5 shows a partial enlarged view of the part indicated by B1 in FIG. 4.
Figure 6:
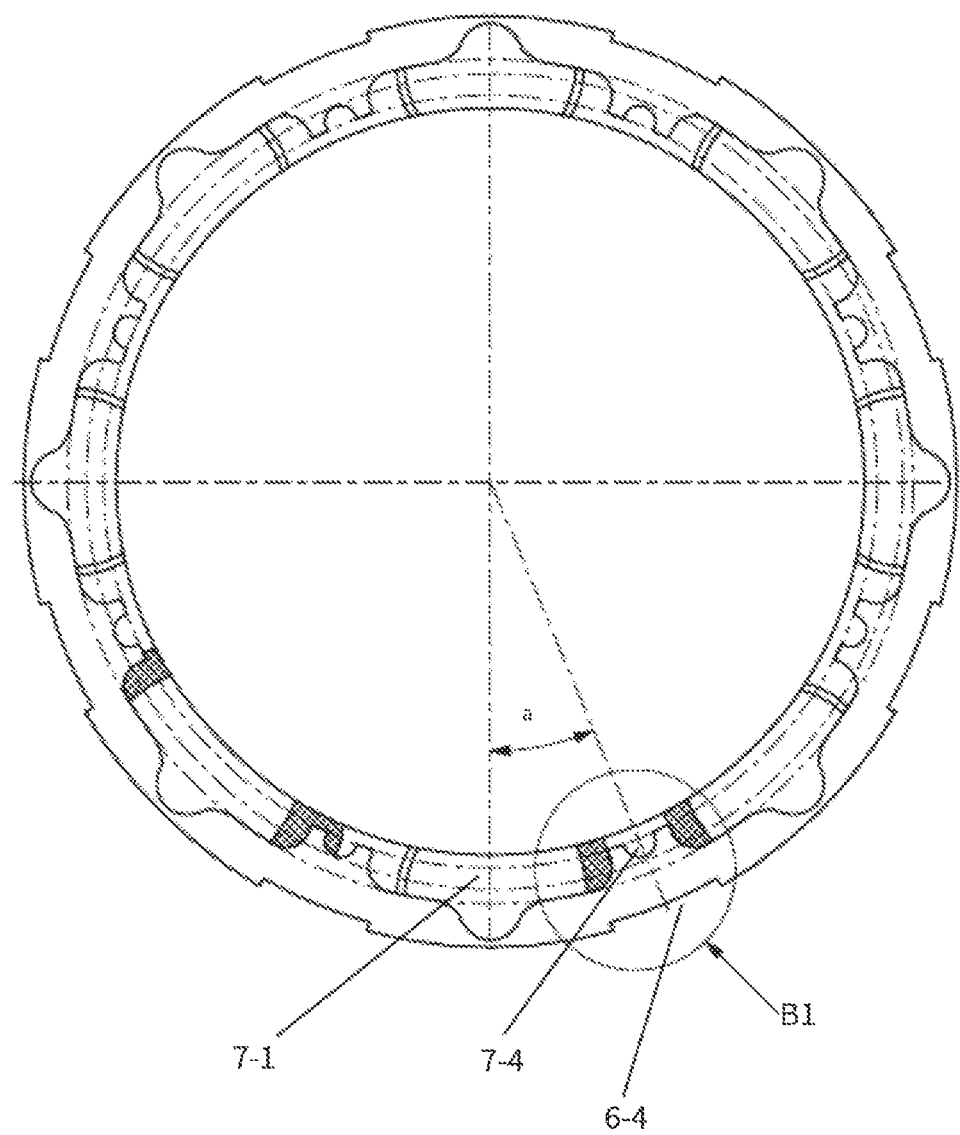
Figure 7:
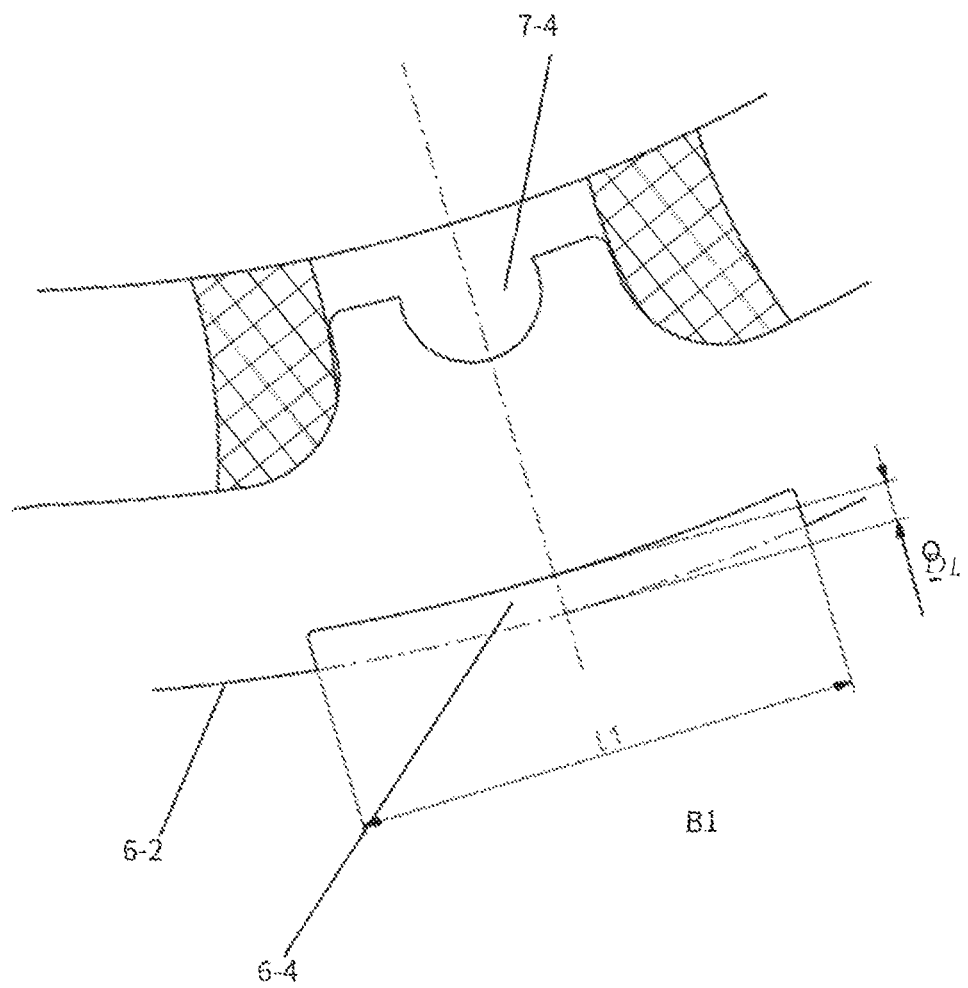

The flange recess 6-4 is, for example, curved (as shown in FIGS. 4 and 5) or roughly rectangular (as shown in FIGS. 6 and 7) in its radial section perpendicular to the central axis X.

In FIGS. 4 and 5, there is a smooth transition between the flange recess 6-4 and the outer circumferential surface 6-2 of the cage flange 6-1, while in FIGS. 6 and 7, the flange recess 6-4 and the outer circumferential surface 6-2 of the cage flange 6-1 are roughly stepped.

According to the above-mentioned embodiments of the present disclosure, the position of the flange recess 6-4 on the outer circumferential surface of the cage flange 6-1 is in the middle of two roller pocket openings 7-1 adjacent to each other.

According to the above embodiments of the present disclosure, the width of the flange recess 6-4 in the direction of the central axis X is equal to the width of the cage flange 6-1 in the direction of the central axis X.

According to the above embodiments of the present disclosure, the maximum depth of the flange recess 6-4 in the radial direction relative to the direction of the central axis X is smaller than the radial height of the cage flange 6-1 in the radial direction relative to the direction of the central axis X.

According to the above-described embodiments of the present disclosure, as shown in FIGS. 4 and 6, an angle α=360/(2×Z) between the central plane of the roller pocket opening along the central axis direction X and the central plane of the flange recess along the central axis direction X, where Z is the number of rolling elements of the rolling bearing.

As shown in FIGS. 5 and 7, the length L1 of the flange recess is set to: π×the diameter of the outer circumferential surface of the cage flange/(3×Z)<=L1<=π×the diameter of the outer circumferential surface of the cage flange/(2×Z), wherein Z is the number of rolling elements of the rolling bearing. The length L1 of the flange recess refers to the linear distance between two recess edges of the flange recess in the outer circumferential direction of the cage flange.

As shown in FIGS. 5 and 7, the maximum depth D1 of the flange recess is set to: 0.02×the diameter of the rolling element<=D1<=0.06×the diameter of the rolling element. The maximum depth of the flange recess refers to the maximum depth of the flange recess in the radial direction relative to the central axis X direction.

The flange recess is arranged in the middle of two adjacent cage pockets, so that the strength reduction of the cage is minimal. The longer the circumferential length and the deeper the radial depth of the flange recess, the more beneficial it is to reduce friction and improve lubrication, but it will reduce the strength/rigidity of the cage.

According to the present disclosure, through the flange recess on the outer circumferential surface of the cage flange, the lubricant flow in the bearing is improved (that is, the lubricant can flow into the space where the rolling elements are located through the flange recess) and the wear of the outer circumferential surface of the cage flange is minimized, that is, the lubricant in the flange recess can lubricate the outer circumferential surface of the cage flange.

The foregoing disclosure provides illustration and description, but it is not intended to be exhaustive or to limit the embodiments to the precise form disclosed. Modifications and variations can be made in light of the above disclosure, or can be acquired from the practice of the embodiments.

Even though specific combinations of features are recited in the claims and/or disclosed in the specification, these combinations are not intended to limit the disclosure of various embodiments. Actually, many of these features can be combined in ways not specifically stated in the claims and/or not specifically disclosed in the specification. Although each subordinate claim listed below may directly depend on only one claim, the disclosure of various embodiments comprises each subordinate claim combined with each other claim in the claim set.

The invention claimed is:

1. A bearing cage for accommodating rolling elements of a rolling bearing, the bearing cage comprises:
   an annular 5 cage base, and
   an annular cage pocket extending from the cage base along the central axis direction of the bearing cage; wherein
   when the bearing cage is inserted and installed in the rolling bearing, there is a first circumferential radial clearance between an outer circumferential surface of the cage base and an inner circumferential surface of an outer ring shoulder of an outer ring of the rolling bearing, and a second circumferential radial clearance between an inner circumferential surface of the cage base and an outer circumferential surface of an inner ring shoulder of an inner ring of the rolling bearing; wherein
   when the first circumferential radial clearance is smaller than the second circumferential radial clearance, the first circumferential radial clearance is equal to the difference between the diameter of the inner circumferential surface of the outer ring shoulder and the diameter of the outer circumferential surface of the cage base divided by 2; and the first circumferential radial clearance is less than or equal to [0.005×(the bottom diameter of the inner ring raceway of the inner ring+the bottom diameter of the outer ring raceway of the outer ring)+0.01×the diameter of the roller element]; and wherein when the first circumferential radial clearance is larger than the second circumferential radial clearance, the second circumferential radial clearance is equal to the difference between the diameter of the inner circumferential surface of the cage base and the diameter of the outer circumferential surface of the inner ring shoulder divided by 2; and the second circumferential radial clearance is less than or equal to [0.0045×(the bottom diameter of the inner ring raceway of the inner ring+the bottom diameter of the outer ring raceway of the outer ring) 30+0.009×the diameter of the roller element].

2. The bearing cage according to claim 1, wherein, when the first circumferential radial clearance is smaller than the second circumferential radial clearance, the first circumferential radial clearance is less than or equal to [0.004×(the bottom diameter of the inner ring raceway of the inner ring+the bottom diameter of the outer ring raceway 5 of the outer ring)+0.008×the diameter of the rolling element].

3. The bearing cage according to claim 1, wherein, when the first circumferential radial clearance is larger than the second circumferential radial clearance, the second circumferential radial clearance is less than or equal to [0.00325×(the bottom diameter of the inner ring raceway of the inner ring+the bottom diameter of the outer ring raceway of the outer ring)+0.006×the diameter of the roller element].

4. The bearing cage according to claim 1, wherein, the base of the cage comprises an annular cage flange extending radially outward toward the outer ring of the rolling bearing;
the first circumferential radial clearance between the outer circumferential surface of the cage flange and the inner circumferential surface of the outer ring shoulder of the outer ring is smaller than or larger than the second circumferential radial clearance between the inner circumferential surface of the cage base and the outer circumferential surface of the inner ring shoulder of the inner ring.

5. The bearing cage according to claim 4, wherein, the diameter of the outer circumferential surface of the cage flange is larger than the outer diameter of the cage pocket.

6. The bearing cage according to claim 5, wherein, the diameter of the inner circumferential surface of the cage base is equal to the inner diameter of the cage pocket.

7. The bearing cage according to claim 5, further comprising:
a plurality of roller pocket openings which are evenly spaced from each other are arranged in the circumferential direction of the cage pocket;
the roll elements can be held in the roller pocket openings; and
a connecting web is arranged between two adjacent roller 5 pocket openings.

8. The bearing cage according to claim 7, further comprising,
a plurality of web recesses evenly spaced from each other are arranged on the inner circumferential surface of the connecting web facing the direction of the central axis; wherein
the web recess extends to the cage base; and
a plurality of web reinforcing ribs evenly spaced from each other are arranged on the outer circumferential surface of the connecting web facing away from the direction of the central axis; and wherein
the position of the web recess on the inner circumferential surface of the connecting web facing the direction of the central axis is in the middle of two roller pocket openings adjacent to each other.

9. The bearing cage according to claim 5, wherein, the outer circumferential surface of the cage flange is provided with a plurality of flange recesses evenly spaced from each other.

10. The bearing cage according to claim 9, wherein, the position of the flange recess on the outer circumferential surface of the cage flange is in the middle of two adjacent roller pocket openings.

11. The bearing cage according to claim 10, wherein, an angle $\alpha=360°/(2\times Z)$ between the central plane of the roller pocket opening along the central axis direction and the central plane of the flange recess along the central axis direction, where Z is the number of rolling elements of the rolling bearing.

12. The bearing cage according to claim 11, wherein, the length L1 of the flange recess is set to: $\pi$Å the diameter of the outer circumferential surface of the cage flange/ (3 Å~Z)<=L1<=$\pi$×the diameter of the outer circumferential surface of the cage flange/(2×Z), wherein 5 Z is the number of rolling elements of the rolling bearing.

13. The bearing cage according to claim 12, wherein, the maximum depth D1 of the flange recess is set to 0.02 Å~the diameter of the roller elements<=D1<=0.06×the diameter of the roller elements.

14. The bearing cage according to claim 11, wherein, the maximum depth of the flange recess in the radial direction relative to the central axis direction is smaller than the radial height of the cage flange in the radial direction relative to the central axis direction.

15. The bearing cage according to claim 10, wherein, the width of the flange recess in the central axis direction is equal to the width of the cage flange in the central axis direction.

16. The bearing cage according to claim 9, wherein, the flange recess is arc-shaped or rectangular in its radial section perpendicular to the central axis.

17. A bearing cage for accommodating rolling elements of a rolling bearing, the bearing cage comprises:
an annular cage base, and
an annular cage pocket extending from the cage base along the central axis direction of the bearing cage; wherein
when the bearing cage is inserted and installed in the rolling bearing, there is a first circumferential radial clearance between an outer circumferential surface of the cage base and an inner circumferential surface of an outer ring shoulder of an outer ring of the rolling bearing, and a second circumferential radial clearance between an inner circumferential surface of the cage base and an outer circumferential surface of an inner ring shoulder of an inner ring of the rolling bearing; wherein the first circumferential radial clearance is smaller than the second circumferential radial clearance, the first circumferential radial clearance is equal to the difference between the diameter of the inner circumferential surface of the outer ring shoulder and the diameter of the outer circumferential surface of the cage base divided by 2; and the first circumferential radial clearance is less than or equal to [0.005×(the bottom diameter of the inner ring raceway of the inner ring+the bottom diameter of the outer ring raceway of the outer ring)+0.01×the diameter of the roller element].

18. A bearing cage for accommodating rolling elements of a rolling bearing, the bearing cage comprises:
   an annular cage base, and
   an annular cage pocket extending from the cage base along the central axis direction of the bearing cage; wherein
   when the bearing cage is inserted and installed in the rolling bearing, there is a first circumferential radial clearance between an outer circumferential surface of the cage base and an inner circumferential surface of an outer ring shoulder of an outer ring of the rolling bearing, and a second circumferential radial clearance between an inner circumferential surface of the cage base and an outer circumferential surface of an inner ring shoulder of an inner ring of the rolling bearing; wherein
   the first circumferential radial clearance is larger than the second circumferential radial clearance, the second circumferential radial clearance is equal to the difference between the diameter of the inner circumferential surface of the cage base and the diameter of the outer circumferential surface of the inner ring shoulder divided by 2; and the second circumferential radial clearance is less than or equal to [0.0045×(the bottom diameter of the inner ring raceway of the inner ring+the bottom diameter of the outer ring raceway of the outer ring)+0.009×the diameter of the roller element].

* * * * *